United States Patent Office 3,412,152
Patented Nov. 19, 1968

3,412,152
NUCLEARLY HALOGENATED DIALKENYL-
AMINOACETANILIDES
George F. Deebel, Dayton, Ohio, assignor to Monsanto
Research Corporation, St. Louis, Mo., a corporation
of Delaware
No Drawing. Filed June 24, 1965, Ser. No. 466,813
4 Claims. (Cl. 260—562)

ABSTRACT OF THE DISCLOSURE

Aminoacetanilides of the formula

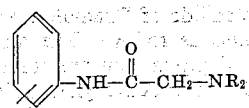

wherein X is halogen with atomic weight greater than 35, $n$ is 1 to 5, and R is an alkenyl hydrocarbon radical of 3 to 6 carbon atoms, together with their hydrohalides; useful as fungicides.

---

This invention relates to aminoacetanilides and, more particularly, to new and valuable nuclearly halogenated diakenylaminoacetanilides and biological compositions in which the new compounds are the essential active ingredients.

According to the invention, the nuclearly halogenated dialkenylaminoacentanilides are prepared by the reaction of a nuclearly halogenated 2-haloacentanilide with a dialkenylamine according to the following equation:

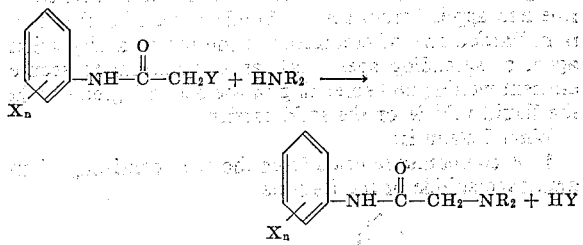

where X is halogen with atomic weight greater than 35, $n$ is an integer of from 1 to 5, R is an alkenyl hydrocarbon radical having from 3 to 6 carbon atoms and Y is halogen.

Presently useful nuclearly halogenated 2-chloroacetanilides are, for example, 2,2'-dichloro-, 2,3'-dichloro-, 2,4'-dichloro-, 3'-bromo-2-chloro-, 4'-bromo-2-chloro-, 2-bromo-2'-iodo-, 2-chloro-4'-iodo, 2,2',4',-trichloro-, 2,2', 5'-trichloro, 2,2',6'-trichloro-, 2,3',4'-trichloro, 2'-bromo-2,6'-dichloro-, 2',5'-dibromo-2-chloro-, 2',6'-dibromo-2-chloro-, 2-chloro-2',5'-diiodo,-, 2,2',6'-triiodo-, 2,2',4',5'-tetrachloro-, 2',4',5'-tribromo-2-chloro-, 2',4',5'-triiodo-2-chloro-, 2,2',3',4',5'-pentachloro-, 2,2',3',4',5',6'-hexachloro-, or 2',3',4',5',6'-pentabromo-2-chloroacentanilide.

Presently useful dialkenylamines are, for example, diallylamine, di-2-butenylamine, di-4-hexenylamine, N-allyl-2-butenylamine, N-allyl-4-hexenylamine and N-2-butenyl-4-hexenylamine.

Nuclearly halogenated dialkenylaminoacetanilides provided by the invention are e.g., 2'(or 3' or 4')-chloro-, 3' (or 4')-bromo-, 2' (or 4')-iodo-, 2',4'-dichloro-, 2',5'-dichloro-, 2',6'-dichloro-, 3',4'-dichloro-, 2'-bromo-6'-chloro,- 2',5'-dibromo-, 2',6'-dibromo-, 2',5'-diiodo-, 2', 6'-diiodo-, 2',4',5'-trichloro-, 2',4',5'-tribromo-, 2',4',5,'-triiodo-, 2',3',4',5'-tetrachloro-, 2',3',4',5',6'-pentachloro-, and 2',3',4',5',6'-pentabromo-2-diallylaminoacetanilider, 3'-chloro-2-bis(2-butenyl)aminoacetanilide; 2',4' - dichloro - 2 - bis(4 - hexenyl)aminoacetanilide; 2' - bromo - 6'-chloro-2-bis(N-allyl-2 - butenyl)aminoacetanilide; 2',6'-diiodo-2-bis(N-allyl-4-hexenyl)aminoacetanilide; and 2', 4',5'-trichloro-2-bis(N-2-butenyl - 4 - hexenyl)aminoacetanilide.

Treatment of the aminoacetanilide compounds with a hydrogen halide, e.g., gaseous or aqueous hydrogen chloride or bromide or iodide or fluoride, yields well-defined crystalline hydrohalides which are advantageously employed in fungistat compositions owing to their water-solubility.

Reaction of the nuclearly halogenated 2-chloroacentanilide with a dialkenylamine to give the presently provided nuclearly halogenated dialkenylaminoacetanilides is conducted by simply contacting the two reactions. Advantageously, in order to obtain smooth reaction and optimum yield of the product, the reaction is conducted in the presence of an inert organic liquid diluent or solvent, which may be, e.g., an aliphatic or aromatic hydrocarbon such as heptane, benzene or xylene; an ether such as diethyl ether, morpholine or tetrahydrofuran; a tertiary amide such as dimethylformamide; an acid such as acetic acid, etc.

Since formation of the present aminoacetanilides takes place by reaction of one mole of a nuclearly halogenated 2-chloroacetanilide with one mole of the dialkenylamine, these reactants are advantageously employed in such proportions. However, the reaction will occur in the presence of a substantial excess of either reactant, which excess may be separated from the product and recovered for further use.

Generally the reaction is not noticeably exothermic so that heating may be required when the reaction is conducted above ambient temperatures. When especially reactive materials are used, it may be necessary in order to obtain high yields of the aminoacetanilides, to moderate the reaction by either maintaining a slow rate of addition by one reactant to the other, by operating in the presence of a diluent, or by stirring so that localized overheating does not occur. However, when working with the somewhat sluggish higher armines, e.g., di-4-hexenylamine, heating may be used for the purpose of decreasing reaction time. Temperatures of from, say, 30° C. to 150° C. are thus useful, e.g., at refluxing temperature when working in the presence of a diluent or solvent. Generally the reaction is conducted at atmospheric pressure, although sub- or superatmospheric pressures may be employed, if desired, for example, to raise or lower the reaction temperature.

Usually the coformed hydrogen halide will react with the produced aminoacetanilide so as to form a hydrohalide. The free aminoacetanilide is readily obtained by reacting the hydrohalide with a base such as sodium hydroxide or with an alkaline salt of a weak acid such as sodium carbonate. To avoid formation of the hydrohalide, the preferred procedure in this invention is to conduct the reaction between the nuclearly halogenated 2-chloroacetanilide and the dialkenylamine in the presence of molar-equivalent sodium carbonate. In this way the coformed hydrogen halide is instantly neutralized and high yields of the aminoacetanilide are obtained. However, other basic materials may be used, e.g., tertiary amines such as pyridine, triethylamine, etc.

The presently provided nuclearly halogenated dialkenyl-aminoacetanilides are stable well-defined compounds which are either liquids or low-melting solids. They are readily convertible to hydrohalides which are generally water-soluble crystalline solids. Either the aminoacetanilides or their hydrohalides are useful, as will be hereinafter shown, as toxicant compositions effective in preventing or inhibiting the growth of fungi. They are also effective in inhibiting growth of a plant virus such as the tobacco mosaic virus, and show activity as local anesthetics and microbiological agents.

The invention is further illustrated by, but not limited to, the following examples.

Example 1

A mixture of 42 g. (0.206 mole) 2,3′-dichloroacetanilide, 11.5 g. (0.108 mole) sodium carbonate, and 100 ml. dimethylformamide was charged to a reaction vessel. To the stirred mixture was added 20.2 g. (0.208 mole) diallylamine and heat was applied to raise the temperature of the mixture to about 50° C. for 3 hours. After removal of the solids, the remaining solution was concentrated under vacuum to remove the solvent and to yield 54 g. of the aminoacetanilide as an oil. The reaction product was converted to the hydrochloride by dissolving in ether and saturating with hydrogen chloride. Crystallization in the presence of a few milliliters of methanol yielded 42 g. (67.8% yield) of powder, melting at 95° C. The material was soluble in water or ethanol. The product was 3′-chloro-2-diallylamino-acetanilide hydrochloride as shown by analysis:

Calcd. for $C_{14}H_{18}Cl_2N_2O$: Carbon, 55.81%; Hydrogen, 5.98%; Chloride, 11.79%. Found: Carbon, 55.53%; Hydrogen, 6.06%; Chloride, 11.79%.

Example 2

The procedure of Example 1 was employed but replacing 2,3′-dichloroacetanilide with an equimolecular amount of 3′-bromo-2-chloroacetanilide. The substituted aminoacetanilide thereby produced was converted to the hydrochloride, resulting in 81.5% yield of a powder, melting at 123–4° C. The material was readily soluble in water or acetone. The product was 3′-bromo-2-diallylaminoacetanilide hydrochloride as shown by analysis:

Calcd. for $C_{14}H_{18}BrClN_2O$: carbon, 48.63%; hydrogen, 5.21%; chloride, 10.27%. Found: carbon, 48.51%; hydrogen, 5.07%, chloride, 10.25%.

Example 3

The procedure of Example 1 was employed but replacing 2,3′-dichloroacetanilide with an equimolecular amount of 4′-bromo-2-chloroacetanilide. The substituted aminoacetanilide was obtained in 99% yield as a solid melting at 63° C. For purification this was converted to the hydrochloride which was then reacted with excess potassium hydroxide to yield the purified aminoacetanilide, melting at 67–8° C. The product was 4′-bromo-2-diallylaminoacetanilide as shown by analysis:

Calcd. for $C_{14}H_{17}BrNO$: carbon, 54.37%; hydrogen, 5.50%; nitrogen, 9.06%. Found: carbon, 54.62%; hydrogen, 5.65%; nitrogen, 9.17%.

Example 4

The aminoacetanilides of Examples 1 and 2 were tested against the soil fungus *Pythium ultimum* as follows. An intimate mixture of 2 volumes of yellow corn meal and 3 volumes of white sand is infested with the organism and incubated for two weeks at 20° C. Then one volume of this infested mixture is blended uniformly with 3 volumes of a good grade of top soil which has been sterilized. To accomplish complete blending the composite of soil and infested mixture is passed through a No. 8 screen three times. A number of small cups are then tightly packed with 30 g. portions of the composite and the surface thereof leveled.

The aminoacetanilide to be evaluated is dissolved in acetone and sufficient water to provide a formulation having a concentraton of 0.1% by weight. One ml. of this formulation is then diluted with 3 ml. water and the resulting 4 ml. portion drenched over the surface of the soil in each cup, care being taken to insure even distribution; the concentration of the compound under test in the soil is thus 30 p.p.m. The cups are then placed in a 100% humidity chamber at 70° F. for 44 hours. Upon removal from the chamber there was observed a definite reduction of the mycelial growth of the organism on the soil which has been treated with either the 3′-chloro- or the 3′-bromo-2-diallylaminoacetanilide, whereas there was abundant growth on the soil of controls, i.e., untreated test samples which had been subjected to the same inoculation and storage.

Example 5

The aminoacetanilide of Example 3 was tested against *Venturia inaequalis* as follows. The aminoacetanilide is formulated as a 30 p.p.m. aqueous solution. One drop is placed in a well of a concave glass slide and two drops of a conidial suspension of *Venturia inaequalis* (adjusted to 625,000 ml.) are added. The slide is placed in a Petri plate, water is added to the plate to provide humidity, and the plate is covered with a lid. Twenty-four hours later the cover is removed and the slide examined. Definite suppression of spore germination by the 4′-bromo-2-diallylaminoacetanilide was noted.

Fungistat compositions containing the present compounds are advantageously formulated either in organic solvents such as acetone or ethanol, or, using the hydrochlorides, in water. These compounds may also be incorporated into solid carriers such as clay, talc, pumice or bentonite to give compositions which may be applied either to infested areas or to a locale which may be subjected to infestation. They may also be dissolved in liquefied gases such as the fluorochloroethanes or methyl chloride and applied from aerosol bombs containing the solution. Particularly advantageous is the use of a dispersion agent or spreading agent such as a surfactant to secure efficient wetting and spreading of the active ingredients in the liquid vehicle or the solid carrier.

What I claim is:

1. A compound selected from the class consisting of an aminoacetanilide of the formula

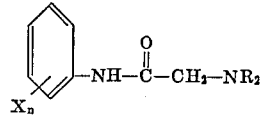

wherein X is halogen with atomic weight greater than 35, $n$ is an integer of from 1 to 5, and R is an alkenyl hydrocarbon radical having from 3 to 6 carbon atoms, and the hydrohalide of said aminoacetanilide.

2. 3′-chloro-2-diallylaminoacetanilide.
3. 3′-bromo-2-diallylaminoacetanilide.
4. 4′-bromo-2-diallylaminoacetanilide.

References Cited

UNITED STATES PATENTS 2,768,166   10/1956   Bruce et al. _____ 260—562 X

FOREIGN PATENTS 782,971   9/1957   Great Britain.

HENRY R. JILES, *Primary Examiner.*

H. I. MOATZ, *Assistant Examiner.*